United States Patent [19]

Coffinberry

[11] Patent Number: 5,143,329

[45] Date of Patent: Sep. 1, 1992

[54] GAS TURBINE ENGINE POWERED AIRCRAFT ENVIRONMENTAL CONTROL SYSTEM AND BOUNDARY LAYER BLEED

[75] Inventor: George A. Coffinberry, West Chester, Ohio

[73] Assignee: General Electric Company, Cincinnati, Ohio

[21] Appl. No.: 738,985

[22] Filed: Aug. 1, 1991

Related U.S. Application Data

[62] Division of Ser. No. 531,718, Jun. 1, 1990.

[51] Int. Cl.$^5$ .............................................. B64C 21/06
[52] U.S. Cl. .................................. 244/209; 244/118.5; 244/53 R; 454/71
[58] Field of Search ...................... 244/118.5, 207, 208, 244/209, 53 R; 60/39.142, 39.07, 39.15, 39.183; 98/1.5

[56] References Cited

U.S. PATENT DOCUMENTS

| | | | |
|---|---|---|---|
| 2,734,443 | 2/1956 | Wood | 98/1.5 |
| 2,777,301 | 1/1957 | Kuhn | 244/118.5 |
| 3,024,624 | 3/1962 | Morley | 62/402 |
| 3,097,817 | 7/1963 | Towzey | 244/209 |
| 3,428,242 | 2/1969 | Rannenberg | 230/116 |
| 3,711,044 | 1/1973 | Matalich | 244/118.5 X |
| 3,878,677 | 4/1975 | Colvin | 60/39.14 |
| 4,193,262 | 3/1980 | Snell | 60/261 |
| 4,419,926 | 12/1983 | Cronin et al. | 98/1.5 |
| 4,462,561 | 7/1984 | Cronin | 244/118.5 |
| 4,482,114 | 11/1984 | Gupta et al. | 244/118.5 X |
| 4,494,372 | 1/1985 | Cronin | 244/118.5 X |
| 4,503,666 | 3/1985 | Christoff | 60/39.07 |
| 4,546,939 | 10/1985 | Cronin | 244/118.5 |
| 4,642,997 | 2/1987 | Krafka | 62/87 |
| 4,666,104 | 5/1987 | Kelber | 244/209 |
| 4,684,081 | 8/1987 | Cronin | 244/118.5 X |

FOREIGN PATENT DOCUMENTS

| | | |
|---|---|---|
| 0065855 | 5/1982 | European Pat. Off. . |
| 0076668 | 4/1983 | European Pat. Off. . |
| 585341 | 9/1942 | United Kingdom . |
| 743598 | 4/1953 | United Kingdom . |
| 744923 | 5/1954 | United Kingdom . |
| 774695 | 4/1955 | United Kingdom . |
| 846358 | 6/1958 | United Kingdom . |
| 1530330 | 1/1976 | United Kingdom . |
| 2027874 | 2/1980 | United Kingdom ............. 244/118.5 |
| 2074654 | 4/1980 | United Kingdom . |
| 2076897 | 12/1981 | United Kingdom ............. 244/118.5 |
| 2127492 | 6/1983 | United Kingdom . |

Primary Examiner—Joseph F. Peters, Jr.
Assistant Examiner—Christopher P. Ellis
Attorney, Agent, or Firm—Jerome C. Squillaro

[57] ABSTRACT

An aircraft gas turbine engine is provided with a starting air turbine that is directly connected through the starter gearbox to the high pressure (HP) shaft and is provided with an apparatus to extract excess energy from engine compressor bleed air, return it to the engine, and to start the engine with compressed air from starting air sources, and to cool and provide compressed air for powering the Environmental Control System (ECS) and using the bleed air for cabin refreshening. The air turbine may be connected to a nacelle boundary layer bleed compressor to bleed boundary layer air from a forward portion of the nacelle to reduce nacelle surface drag. The ECS may be provided with a wing boundary layer bleed means which uses a cooling air fan in the ECS to draw cooling air through the heat exchangers in the ECS pack from the boundary layer air from a forward portion of the aircraft's wing to reduce its surface drag.

7 Claims, 6 Drawing Sheets

GAS TURBINE ENGINE POWERED AIRCRAFT ENVIRONMENTAL CONTROL SYSTEM AND BOUNDARY LAYER BLEED

This is a division of application Ser. No. 07/531,718 filed Jun. 1, 1990.

BACKGROUND OF THE INVENTION

The invention relates to aircraft environmental control systems powered by gas turbine engines for supplying aircraft system bleed air. In particular, the invention relates to an aircraft gas turbine engine powered bleed air supply system for an environmental control system wherein the excess pressure energy is returned to the engine to improve fuel efficiency and the system is also used to reduce drag on engine nacelles or other surfaces by pumping boundary layer air. Environmental control systems, commonly referred to as ECS systems, incorporate various pieces of equipment such as turbocompressors, regulating valves, heat exchangers, and other devices in a system which is often referred to as and ECS pack to condition engine bleed air. Modern day jet aircraft use turbocompressors in their environmental controls systems to condition bleed air for use in the cabin wherein the turbocompressors are powered by the same bleed that is conditioned for cabin refreshing air and which is usually supplied by the gas turbine engines which provide aircraft propulsion. Bleed air is conventionally taken from the engine compressor at a stage downstream of the variable vane compressor stages so as not to interfere with the operation of the variable vane stages which greatly enhance the efficiency of the gas turbine engine and greatly reduces the specific fuel consumption (SFC) of the engine.

The compressor bleed air is cooled by fan air in a heat exchanger and is then delivered to the environmental control system for controlling cabin air freshness, pressure, and temperature. The ECS conventionally includes two ECS packs mounted in ECS bays on different sides of the aircraft which receive compressor bleed air from the engines. The bleed after being used to power the ECS pack and refresh the cabin is then dumped overboard. All the energy remaining in the bleed air dumped overboard cost fuel and therefore represents a significant loss in specific fuel consumption.

Extraction of aircraft bleed air from the engine compressor has adverse affects on the propulsion cycle and engine life. Engine turbine power is needed to compress air and account for compressor inefficiency. Therefore, extra fuel consumption is always associated with gas turbine engine compressor bleed air (air which does not produce thrust). This extra fuel burned in the engine combustor results in higher gas temperature delivered to the engine turbine and reduction of turbine blade life. Such penalties must be incurred in order that the engine turbine provide extra power associated with bleed air.

It is not possible, without undue complexity, to always bleed the engine compressor stage which provides exactly the correct pressure needed for the aircraft anti-ice and ECS systems. Typically only two bleed ports are provided. Therefore, the result is to bleed air which exceeds minimum pressure requirements resulting in even higher penalty to the engine cycle than would be required by the aircraft systems.

Most often the bleed air is not only at a higher than required pressure, it is also too hot. For reasons of fire safety, maximum bleed air temperature is usually limited to 350° to 500° F. Temperature control requires cooling the bleed air with a precooler. Most modern engines use fan air to cool compressor bleed air. Use of fan air imposes an additional penalty on fuel consumption. Further, the precooler is usually large and requires a fan air scoop which produces drag. A typical large turbofan engine will consume about 2% extra fuel and run at about 20° F. hotter turbine temperature in order to provide aircraft system bleed air. The present invention addresses these problems and deficiencies characteristic of the prior art and conventional apparatus used to supply aircraft bleed air.

A second aspect of this invention concerns the engine air driven starter. Air starters are conventionally air powered turbines having planetary gearboxes which are usually connected to a high pressure rotor in driving relationship and mounted to the engine accessory gearbox. The starter turbine rotates at very high speed and drives the engine through a planetary gear system during engine acceleration to just below idle speed. Once the engine lights it begins to develop its own power and, at a speed below idle, accelerates away from the starter. An overrunning mechanical clutch allows the starter to disengage and then the starter air is shut off and the starter turbine comes to rest. During the remainder of the flight the starter is not used for any purpose and simply represents extra weight carried around by the aircraft.

Within a very narrow flight profile of the aircraft, the starter can sometimes be used for emergency engine relight, but only at conditions where the windmill speed of the engine is low enough that the starter clutch can be engaged without damage due to what is referred to as crash engagement. Engine starters can not be used during normal aircraft cruise conditions; where the only means for relight is from the freely windmilling engine. One advantage of the present invention is that it permits operation of the air starter during all aircraft flight conditions thereby avoiding the delay in engine relight which can be associated with flight conditions unfavorable for fast windmill relights. The present invention further enhances the solution to the relight problem by using the starter turbine during all operation conditions as a means for improving the performance of the auxiliary bleed air compressor.

A third advantage of this invention relates to aerodynamic drag associated with engine nacelles, wings, pylons, tail sections and other aircraft outer surfaces. As air flows on to and over a surface such as an engine nacelle and aircraft wing it progressively builds up a low velocity boundary layer of increasing thickness. Within this boundary layer a portion of the velocity component of free stream total pressure is converted to increased static pressure. As the result of rise in static pressure, boundary layer thickness, and diffusion a point is reached where back pressure causes an otherwise laminar boundary layer to become turbulent.

In the turbulent region, a considerable amount of total pressure is converted to static temperature represented thermodynamically as an increase in entropy. By the time the boundary layer leaves the surface, or in the particular case of an aircraft gas turbine engine the end of the nacelle, an unrecoverable loss in total pressure has occurred. The large entropy rise associated with turbulence is at the expense of air momentum. Turbulence also gives rise to increased static pressure which may increase the intensity of rearward acting pressure force on the surface. Now, if the boundary layer thickness is kept small, separation and turbulence will not occur or will be delayed and drag can be substantially reduced.

One way to avoid increase in boundary thickness is to pump or bleed off boundary layer air through holes in the surface. Boundary layer pumps or compressors would be desirable from an aerodynamic standpoint but, because of the relatively large air flow rates and added weight and complexity associated with effective boundary layer pumping or bleeding, the concept has not been adapted in modern aircraft and engines. Therefore in one embodiment of the invention, this invention provides a means for effectively and economically using the engine starting turbine to power a nacelle boundary layer bleed compressor to bleed off laminar flow boundary layer air from the nacelle to reduce drag. Yet another embodiment uses an ECS heat exchanger cooling fan to bleed off laminar flow boundary layer air from the wing to reduce drag.

A similar problem was addressed in and reference may be made to the patent application Ser. No. 07/489,150 entitled "AIRCRAFT ENGINE STARTER INTEGRATED BOUNDARY BLEED SYSTEM", invented by Samuel Davison, filed Mar. 6, 1990 and assigned to the same assignee and incorporated herein by reference. Bleed air taken into the engine compressor also incurs a ram drag penalty (loss of momentum). Engine net thrust is equal to engine exhaust momentum minus inlet ram drag.

It is, therefore, an object of the present invention to provide a more efficient aircraft gas turbine engine by using the energy in the compressor bleed air that is conventionally wasted.

It is another object of the present invention to provide a lighter weight and more efficient and longer life aircraft gas turbine engine A further object of the present invention is to reduce or eliminate the need for engine fan supplied cooling air for the ECS bleed air precooler.

Another object of the present invention is to provide a fuel efficient system for supplying compressed air to the aircraft ECS systems.

Another object of the present invention is to provide the engine with a quick and reliable in flight restart or relight capability.

Yet another object of the present invention is to provide the engine with a starter that avoids the need for crash engagement for in flight relight.

A further object of the present invention is to reduce aircraft boundary layer drag in a fuel efficient manner.

Another object of the present invention is to use boundary layer bleed air to reduce base pressure drag in low pressure regions of the aircraft engine fan duct.

These objects and other features and advantages will become more readily apparent in the following description when taken in conjunction with the appended drawings.

SUMMARY OF THE INVENTION

Briefly, in accordance with one aspect of the present invention, an environmental control system apparatus for an aircraft powered by a gas turbine engine is provided with an engine compressor bleed supply means and an energy recovery means for returning the unrequired or unused amount of energy back to the engine. The energy recovery means includes a starting air turbine mechanically linked in driving relationship through the starter air turbine's planetary gearbox to the high pressure rotor of the gas turbine engine wherein the air turbine includes a variable inlet and a means to control it which is in switchable fluid supply communication with sources of compressed starting air and gas turbine engine compressor bleed air and provided with a means for ducting its exhaust flow to an environmental control system pack ECS compressor. The ECS includes a means for producing a pressure differential signal which is provided to the variable inlet control means for controlling the variable inlet.

Another embodiment of the invention provides an auxiliary compressor drivingly linked to the starting air turbine, preferably on a common shaft, and having an inlet in fluid communication with a means for bleeding a portion of the boundary layer air from the outer surface of the nacelle.

Yet another embodiment includes an ECS heat exchanger cooling fan driven by the turbine of the ECS turbocompressor wherein the ECS fan includes an inlet in fluid communication with a means for bleeding a portion of the boundary layer air from a forward portion of the outer surface of the aircraft wing.

According to another embodiment of the present invention the means for bleeding a portion of the boundary layer air from a forward portion of the outer surface of the aircraft wing or nacelle includes a perforated outer skin connected to an annular plenum below the perforated skin.

And another embodiment includes a means for dumping the boundary layer bleed air into a low pressure region of the fan duct that produces base pressure drag on the engine such as the aft end of the pylon fairing.

DETAILED DESCRIPTION OF THE OF THE INVENTION

Figure 1:
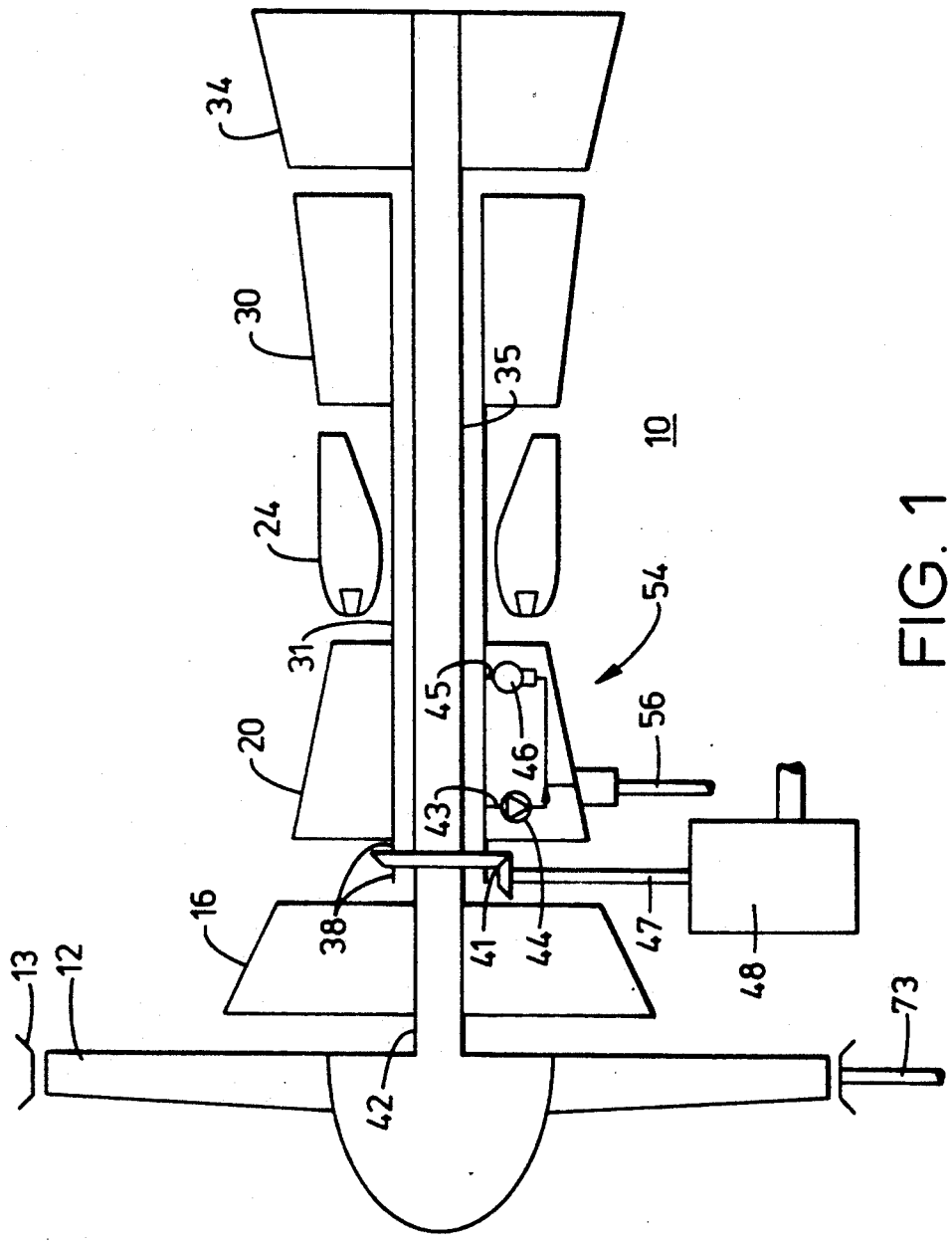
FIG. 1 is a schematic representation of an aircraft dual rotor gas turbine engine.

FIG. 1 illustrates a typical gas turbine engine 10 having in serial flow relationship a fan section 12, a low pressure compressor (LPC) 16, a high pressure compressor (HPC) 20, a combustion section 24, a high pressure turbine (HPT) 30, and a low pressure turbine (LPT) 34. A high pressure rotor 31 includes high pressure (HP) shaft 38 which connects, in driving relationship HPT 30 to HPC 20 and a low pressure rotor 35 includes a low pressure shaft 42 disposed within high pressure (LP) shaft 38 which drivingly connects LPT 34 to LPC 16 and fan 12. A power takeoff shaft 47 drivingly connects HP shaft 38 to starter gearbox 48 through a transfer gearbox 38 depicted by the 45 degree bevel gears in FIG.

A compressor bleed means 54, in FIG. 1, includes a mid compressor bleed line 43, preferably a seventh stage bleed for a General Electric CF6-80C2, and a compressor discharge bleed line 45 manifolded together and ducted out of HPC 20 by a compressor bleed duct 56. Disposed in mid compressor bleed line 43 is a check valve 44 which prevents higher pressure air from compressor discharge bleed line 45, which has a pressure actuated shutoff valve 46 disposed in it, flowing into a midstage of the compressor. During idle operation of the gas turbine engine 10 air from compressor discharge bleed line 45 is used and during the rest of the engine's operation compressor bleed air is supplied from mid compressor bleed line 43 to compressor bleed duct 56.

Figure 2:
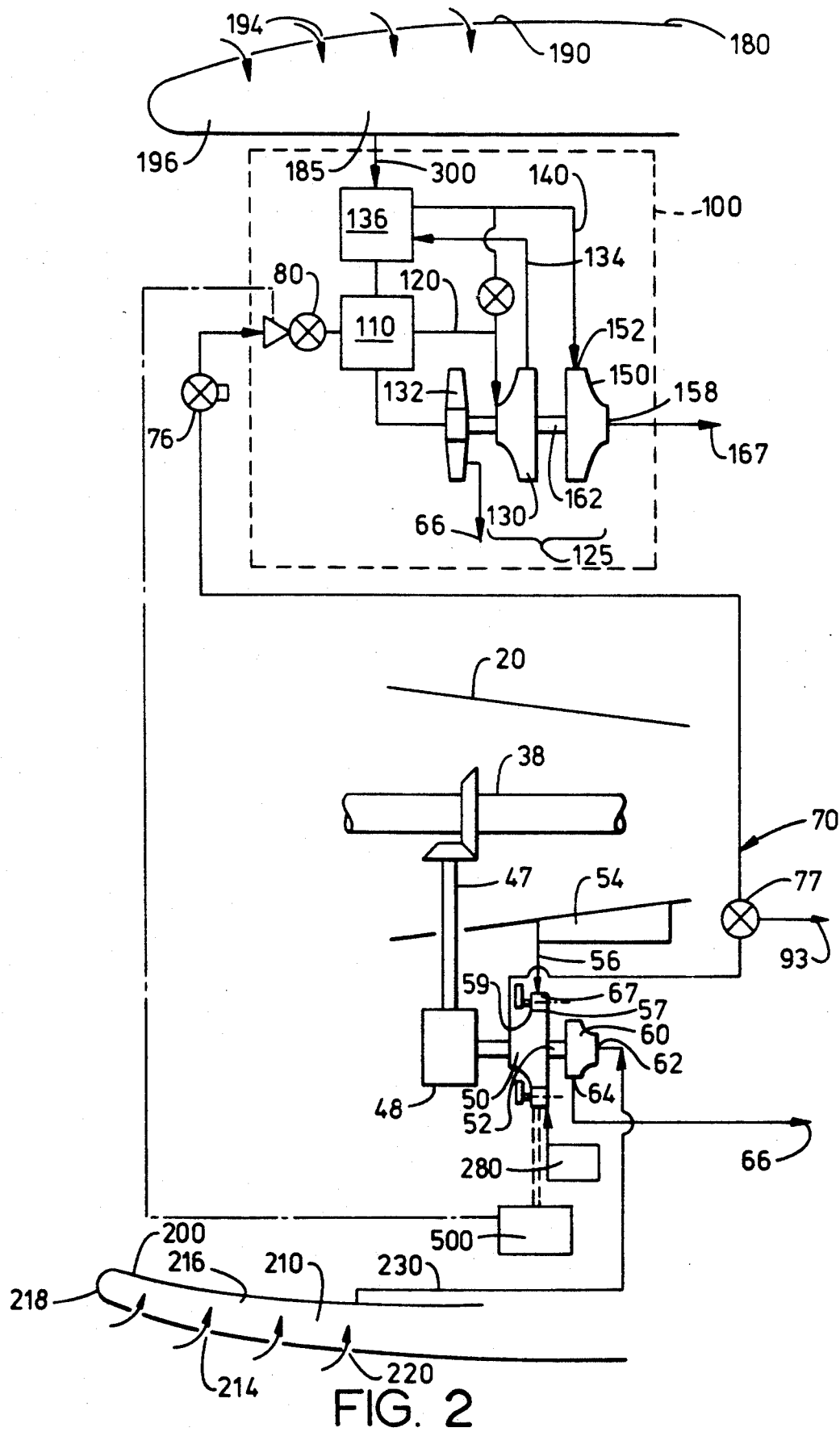
FIG. 2 is a schematic representation of the preferred embodiment of the gas turbine engine powered aircraft environmental control system and aircraft boundary layer bleed of the present invention.

FIG. 2 schematically depicts the preferred embodiment of the present invention for a wing mounted aircraft gas turbine engine 10. The preferred embodiment includes a power supply means for an aircraft ECS using compressed air supplied by a gas turbine engine bleed means 54 from a midstage bleed line 43 or a compressor discharge bleed line 45 and an energy recovery means for returning the unrequired or unused amount of energy back to engine 10. The energy recovery means includes a starting air turbine 50 drivingly connected through a starter gearbox 48 and power takeoff shaft 47 to HP shaft 38. Starter gearbox 48 is preferably a planetary type gearbox so as to be able to efficiently receive and distribute power supplied to it by air turbine 50 and is conventionally integrated within the same casing or assembly (not shown) as air turbine 50.

Air turbine 50 is preferably a single stage radial inflow air turbine having an air turbine inlet 57. Compressor bleed means 54 on engine 10 is connected in fluid supply communication by a compressor bleed duct 56 to air turbine inlet 57. A switchable starting air supply means 280, conventionally ducted to air turbine inlet 57 through a multi-function duct 70, provides sources of starting air including inflight sources such as crossbleed systems from other engines. Disposed in multi-function duct line 70 is a switchable staring air dump valve 77 having a overboard dump line 93.

Air turbine 50 includes a variable vane inlet 57 to control the pressure of compressed engine bleed air supplied to ECS flow control valve 80. The energy recovery means further provides for control of variable vane inlet 57 which is maintained by closed loop controller 500 which responds to a differential pressure signal provided by ECS flow control valve 80. Closed loop controller 500 closes and opens variable vane inlet 57, like the iris on a camera lens, in order to prevent less than a preselected pressure differential, about 1 psid or as system requirements dictate, across ECS flow control valve 80.

During engine ground start operation of the invention illustrated in FIGS. 1 and 2 air turbine 50 operates as a conventional air starting turbine receiving compressed starting air from starting air supply 280. Starting air is then dumped overboard by starting air dump valve 77 through line 93. The power created from air turbine 50 cranks HPT shaft 38 through starter gearbox 48 until engine 10 is capable of continuing operation without assist from air turbine 50. At this point of the engine's operation air turbine 50 continues to operate off of the compressor air supplied from compressor bleed means 54 unlike conventional starters which employ some sort of clutch mechanism after engine start to disconnect the starting turbine Starting air valve 77 is then returned to a position which allows compressor bleed air to reach ECS pack 100.

The preferred embodiment, as shown in FIG. 2 is provided with an aircraft nacelle boundary layer bleed means having a nacelle boundary layer bleed means 216 including a perforated skin 214 surrounds a forward nacelle portion 220 having disposed within a nacelle plenum 210 for bleeding a portion of the boundary layer from the forward portion of the nacelle 220 which extends aft from about the nacelle leading edge 218. Nacelle plenum 210 is ducted to a nacelle boundary layer compressor 60 via nacelle bleed duct 230. Nacelle boundary layer compressor 60 is drivenly connected to air turbine 50 preferably on a common rotor or shaft 52 and maybe integrally mounted within a common casing with air turbine 50 so as to form a staring air and aircraft boundary layer bleed turbocompressor. In the preferred embodiment, boundary layer compressor 60 is a centrifugal compressor having a nacelle boundary layer bleed inlet 62 and outlet 64 which dumps to a low pressure region of the engine 66 such as in the fan bypass duct 13, schematically depicted in FIG. 1, where it may be used for thrust and reduction of localized fan duct base pressure drag.

Figures 5, 5A:
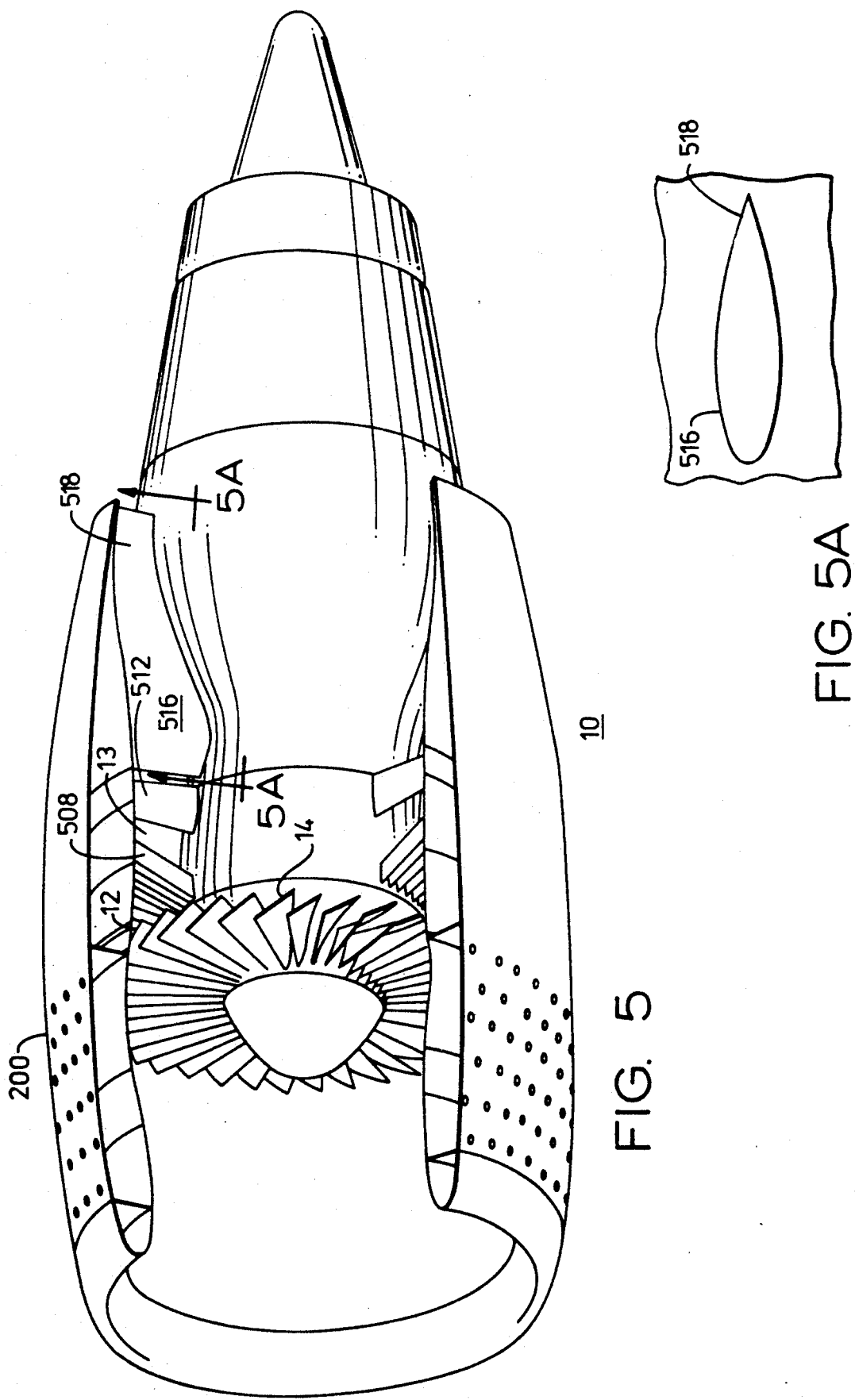
FIG. 5 is a cutaway perspective drawing of an aircraft engine fan duct.
FIG. 5a is a cross section AA taken through the pylon fairing in FIG. 5 looking radially inward toward the engine.

FIG. 5 shows, in greater detail, one low pressure region 518 of fan duct 13 of particular note. FIG. 5 shows engine 10 having a fan section 12 including fan blades 14 circumscribed by annular nacelle 200 which forms the radially outward wall of fan duct 13 aft of fan blades 14. Radially disposed within fan duct 13 in serial flow relationship are fan exit guide vanes exit guide vanes 508, struts 512, and pylon fairings 516 respectively. Pylon fairing 516 conventionally has an airfoil shaped cross section as is more particularly shown in FIG. 5A which shows a cross section AA, looking radially inward, of the pylon fairing 516 shown in FIG. 5. The cross section more particularly points out the aerodynamic shape of pylon fairing 516 designed to reduce its drag thus giving it a thickened front end and a narrow thinned out aft end where the low pressure induced base pressure drag occurs. Low pressure region 518 lies in the thinned out aft section of airfoil shaped pylon fairing 516 which passes across fan duct 13.

The boundary layer air is bled from the nacelles, wings, and tail assemblies, is ambient pressure air having a substantial velocity relative to the aircraft thereby causing the aircraft to incur a significant ram air drag penalty when the air and its momentum is taken on board. Using this compressed bleed air to reduce base pressure drag compensates, to some extent, the ram air drag penalty. Dumping this used bleed air in a low pressure region of the fan duct such as in the thin section 518 of pylon fairing 516 reduces base pressure drag, and produces some extra thrust so as to further compensate for the ram air drag penalty. A description and of low pressure induced base pressure drag may be found in the classical reference on the subject of drag, FLUID-DYNAMIC DRAG by Sighard Hoerner incorporated herein by reference.

ECS pack 100, which has its various components depicted within the dotted rectangle in FIG. 2, is ducted to air turbine outlet 59 via a multi-function bleed duct 70 for receiving ECS bleed air. A multi-function bleed duct 70 conventionally also provides compressed starting air to the starting air turbine 50 and anti-icing air when needed. Operably disposed in multi-function bleed duct 70, in serial flow relationship, is a pressure regulating valve 76 used to limit the pressure within multi-function bleed duct 70 and a flow control valve 80 used to measure the amount and adjust the pressure of the bleed flow to the ECS pack 100.

Multi-function bleed duct 70 ducts ECS bleed air to primary heat exchanger 110 located in ECS pack 100 from where it is ducted to an ECS turbocompressor 125 via an ECS turbocompressor inlet duct 120 and used to power the ECS turbocompressor 125. Although in the preferred embodiment there should be no need for an engine compressor bleed air precooler, if air turbine 50 can be sized properly to provide, through expansion, all the cooling required of the engine compressor bleed air ducted through duct 70, there may be designs that require some precooling that may be provided by such a precooler as depicted in an alternate embodiment shown in FIG. 4 and explained in further detail further on herein.

ECS turbocompressor 125 includes an ECS compressor 130 which receives ECS bleed air from duct 120 and ducts it to a bleed air powered ECS turbine 150 via an intercooler duct 134 which first passes through a secondary heat exchanger 136 for the purpose of intercooling the ECS bleed air after it has been compressed by ECS compressor 130. The ECS bleed air is expanded through ECS turbine 150 to power the ECS turbine and cool the ECS bleed air and subsequently ducted to the aircraft cabin 167. ECS turbine 150 is mounted in driving relationship on a common turbocompressor shaft or rotor 162 with ECS compressor 130 and an ECS cooling fan 132.

The preferred embodiment further provides a wing boundary layer bleed means 185 including a forward wing portion 190 of aircraft wing 180 wherein the forward portion is covered with a perforated wing skin 194 disposed about a wing plenum 180 which exhausts to ECS cooling duct 300 which passes through and provides the cooling air for secondary heat exchanger 136 and primary heat exchanger 110. During operation ECS cooling fan 132, driven by ECS turbine 150, draws the boundary layer off the wing as opposed to being unused in a conventional system wherein air scoops on the outside of the aircraft use ram air to cool the heat exchangers. Therefore the present invention has the added advantage of not requiring any additional rotating equipment such as a compressor to bleed a portion of the boundary off of the wing. This advantage significantly reduces any additional complexity or weight that might otherwise be added to the aircraft and its gas turbine engines.

Figure 3:
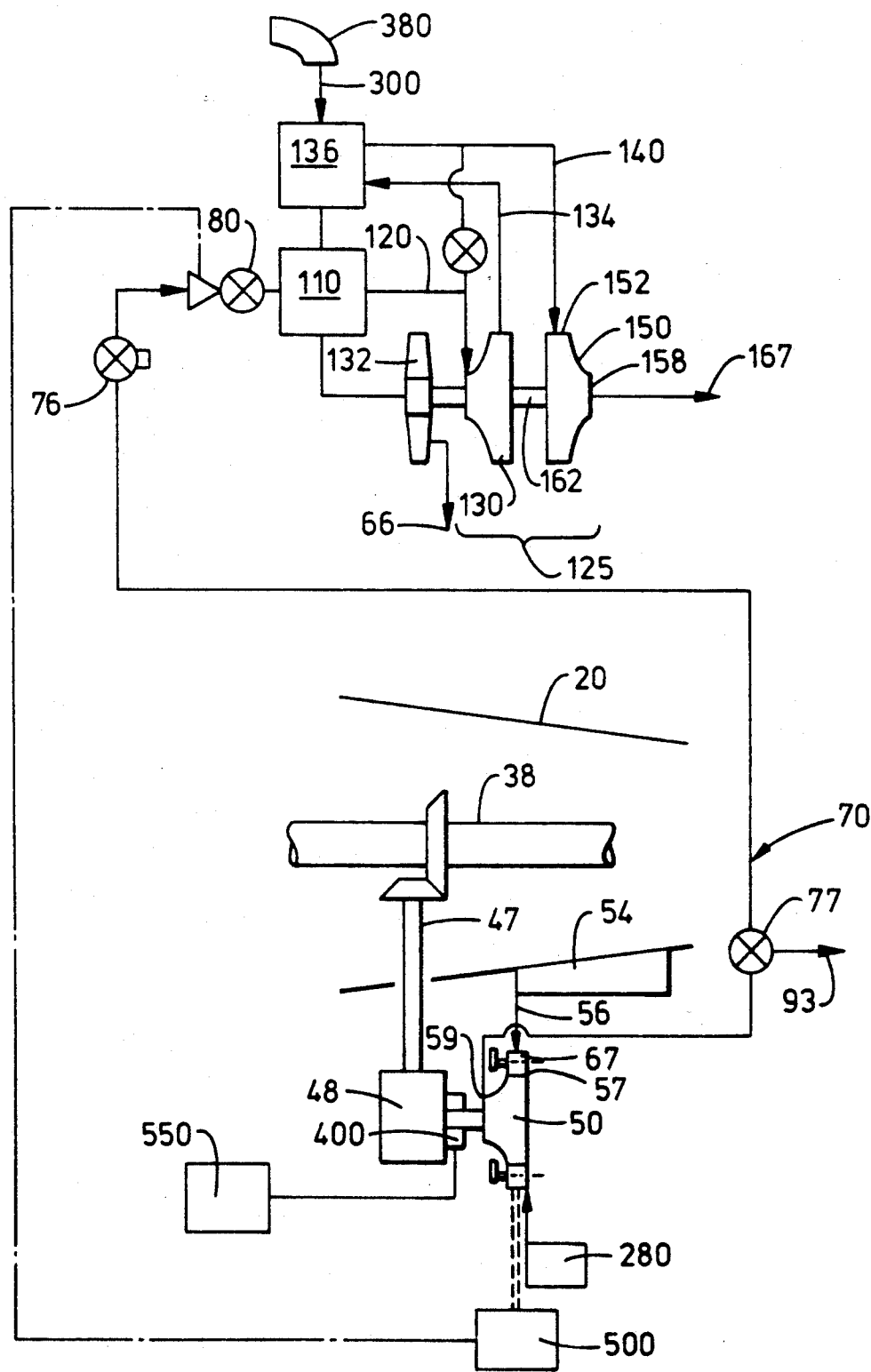
FIG. 3 is a schematic representation of the an alternate embodiment of the present invention as shown in FIG. 2 without the aircraft boundary layer bleed features.

Another embodiment is depicted in FIG. 3 does not include either the nacelle or the wing boundary layer bleed features of the embodiment in FIG. 2 and incorporates a conventional aircraft cooling air scoop to gather cooling air for heat exchangers 110 and 136 in ECS pack 100. A speed control means 550, which may be electronic, mechanical, or hydraulic in operation and either automatically or manually controlled, provides the proper switching of gear ratios for two speed drive 400 thus allowing turbine 50 to operate at two different gear ratios with respect to HP shaft 38. A two speed, preferably clutch operated, drive 400 is schematically shown located between air turbine 50 and gearbox 48 so as to allow air turbine 50 to operate at two different gear ratios with respect to HP shaft 38 corresponding to engine start-up and running conditions respectively. Drive 400 is preferably a planetary gear type drive or gearbox and the clutch is preferably integrated into the planetary gearbox assembly.

As illustrated in FIG. 2, the preferred embodiment of the present invention, air turbine 50 continues to operate after engine start-up is complete and provides multiple functions and capabilities not found in conventional aircraft gas turbine engines. Starting air turbine 50 expands and therefore cools the compressor bleed air received from compressor bleed means 54 thereby reducing or eliminating the need for a bleed air precooler as found in conventional ECS systems if the system is properly sized and designed.

Figure 4:
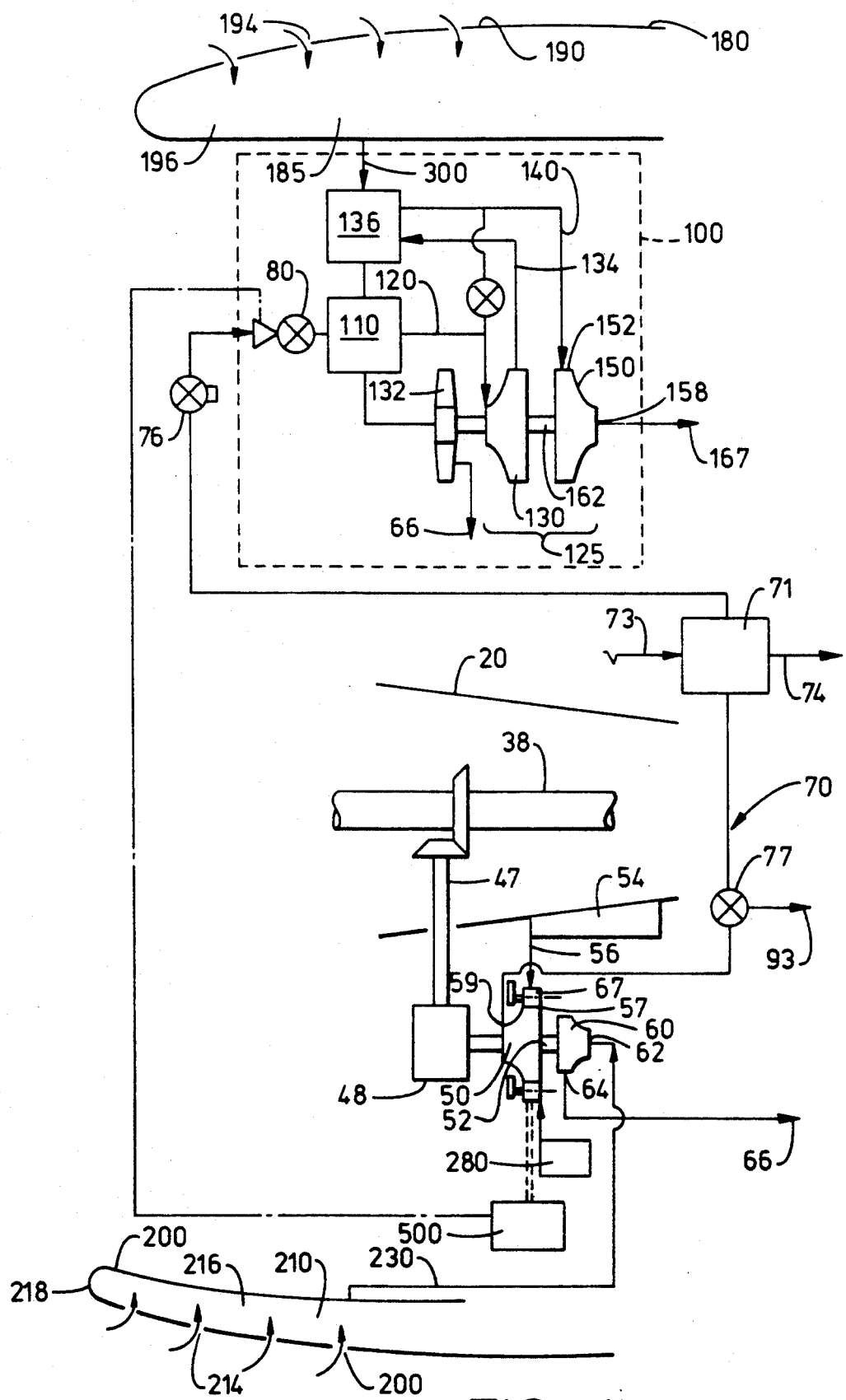
FIG. 4 is a schematic representation of the an alternate embodiment of the present invention as shown in FIG. 3 which includes an engine fan supplied precooler to precool the bleed air for the ECS.

However, an alternate embodiment, shown in FIG. 4, adds, to the preferred embodiment shown in FIG. 2, a fan powered compressor bleed air precooler 71 which requires little or no fan powered cooling air under most conditions but is included for those portions of the engine's flight envelope where it may be required or beneficial. Thus a substantial reduction in specific fuel consumption may be accomplished by reducing or eliminating the use of fan air for compressor bleed air precooling over a substantial portion of the aircraft gas turbine engine's operational envelope. Referring to FIG. 4, a fan bleed air duct 73, also shown in FIG. 1, ducts pressurized cooling air through compressor bleed air precooler 71, where it cools the compressor bleed air in compressor bleed air duct 70 being ducted to ECS pack 100, before being dumped through dump line 74.

Figure 6:
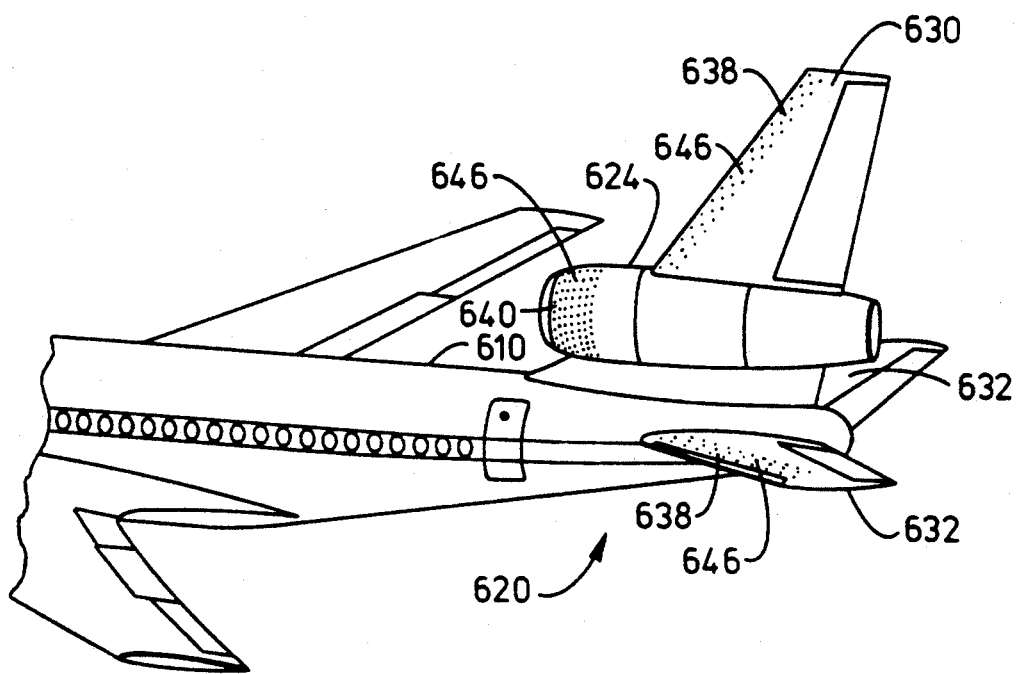
FIG. 6 is a perspective view of a tail assembly of an aircraft having a tail engine mounted in a tail engine nacelle.

An alternative embodiment shown in FIG. 6, contemplates bleeding boundary layer air from the airfoil structures of the tail assembly of an aircraft, such as the McDonnell Douglas DC-10 or MD-11, having a tail mounted engine. Such an embodiment would include the nacelle mounted engine and use the same ECS packs of FIG. 2 but without the wing boundary bleed system since the engine is not mounted near a wing. The embodiment includes the nacelle boundary bleed system 216 including air turbine 50 which drives nacelle boundary bleed compressor 60 as shown in FIG. 2. Referring to FIG. 6, the aircraft 610 includes a tail assembly 620 having a tail engine nacelle 624, a horizontal stabilizers 632 and vertical stabilizer 630. The tail engine nacelle 624 contains a gas turbine engine as in FIG. 2 but without powered wing bleed system. Nacelle 624 and stabilizers 630 and 632 each have respective perforated skin covered forward portions 638 of the stabilizers and 640 of the tail engine nacelle. The nacelle boundary layer bleed compressor 60 depicted in FIG. 2 is used to bleed air boundary layer air for the tail engine nacelle 624, vertical stabilizer 630, and horizontal stabilizers 632 through perforations 646 through an integrated series of flowpaths and plenums (not shown) beneath the perforated skins. It is contemplated that the plenums beneath the stabilizers would have flowpaths connected to a tail engine nacelle plenum and associated nacelle boundary layer bleed system similar to that shown in FIG. 2.

The present invention provides a distinct advantage for improving specific fuel consumption by returning otherwise unused energy to the engine and using the starting air turbine and ECS pack to reduce drag on the nacelles, wings, and tail assemblies by bleeding off boundary layer air. Sample calculations to determine the magnitude of the advantages that can be realized from the present invention were made based on the following presumptions. Typical Boeing 767-300 and McDonnell Douglas MD-11 aircraft having two and three General Electric CF6-80C2 engines respectively and passenger loads of 261 and 348 people respectively and for operating conditions at a 35,000 foot cruising altitude at a point where the engines are operating at thrust levels of 8400 and 8600 pounds respectively. The return of the unused energy in the compressor bleed flow represents a calculated reduction of 0.68% and 0.52% in specific fuel consumption for each respective engine and the nacelle boundary layer bleed means contributes approximately an additional reduction of 0.79% and 0.8% in specific fuel consumption per engine respectively The wing boundary layer bleed means contributes a calculated reduction of 1.6% per aircraft or 0.8% per wing mounted engine in specific fuel consumption The total projected reduction in specific fuel consumption is over 2% per aircraft, representing a significant fuel savings to the aircraft operators. The present invention has been described in an illustrative manner. It is to be understood that the terminology which has been used is intended to be in the nature of words of description rather than of limitation. It is important to note the multifunctionality ascribed to many elements of the invention such as ducts, valves, fans, and compressors which provide the advantages of decreased engine and aircraft specific fuel consumption and lower aircraft drag. The invention contemplates using the energy recovery system and the wing, the nacelle, and the combination nacelle and tail assembly boundary layer bleed systems individually as well as in combination in various embodiments of the present invention.

Obviously, many modifications and variations of the present invention are possible in light of the above teachings. It is, therefore, to be understood that within the scope of the appended claims, the present invention may be practiced otherwise than as specifically described.

What is claimed is:

1. An environmental control system and aircraft boundary layer bleed system apparatus powered by an aircraft propulsive gas turbine engine, said apparatus comprising:
    a bleed air means to bleed compressor bleed air from a compressor stage of the gas turbine engine,
    a starting air turbine in fluid supply communication with said bleed air means effective for extracting energy from the bleed air supplied by said bleed air means and converting the extracted energy to useful work,
    a work transmission means operably connected to said starting air turbine effective to return the work from said air turbine to the engine, a first bleed duct in fluid supply communication with said energy extraction and work conversion means to supply bleed air exhaust from said air turbine to a means for conditioning cabin air for an aircraft, and
    at least one means for bleeding boundary layer air form the surface of the aircraft.

2. An apparatus as claimed in claim 1 wherein said means for bleeding boundary layer air includes a nacelle boundary layer bleed means comprising; a perforated skin surrounding a forward nacelle portion having a nacelle plenum disposed within; a nacelle bleed duct connecting, in fluid supply communication, said nacelle plenum to an inlet of a boundary layer compressor drivenly linked to said air turbine.

3. An apparatus as claimed in claim 2 wherein said boundary layer compressor and said air turbine are mounted on a common shaft and said transmission means comprises a shaft means including said common shaft connecting said air turbine in driving relationship through an starter gearbox to a rotor in the engine.

4. An apparatus as claimed in claim 1 wherein said means for bleeding boundary layer air includes a wing boundary layer bleed means comprising;
    a perforated skin surrounding a forward wing portion having a wing plenum disposed within; and
    an Environmental Control System cooling duct connected, in fluid supply communication, said wing plenum to an inlet of an Environmental Control System cooling fan drivenly linked to an Environmental Control System turbine.

5. An apparatus as claimed in claim 2 wherein said means for bleeding boundary layer air includes a wing boundary layer bleed means comprising;
    a perforated skin surrounding a forward wing portion having a wing plenum disposed within; and
    an Environmental Control System cooling duct connected, in fluid supply communication, said wing plenum to an inlet of an Environmental Control System cooling fan drivenly linked to an Environmental Control System turbine.

6. An apparatus as claimed in claim 2 or claim 3 wherein said nacelle is a tail engine nacelle and said apparatus further comprises a tail assembly boundary layer bleed means including a horizontal stabilizer boundary layer bleed means and vertical stabilizer boundary layer bleed means in fluid communication with said nacelle plenum.

7. An apparatus as claimed in claim 2 or claim 3 further comprising a low pressure base pressure drag producing region of a fan duct in said gas turbine engine and a means for introducing the boundary layer air bled by said means for bleeding boundary layer air into said low pressure base pressure drag producing region of a fan duct.

* * * * *